UNITED STATES PATENT OFFICE.

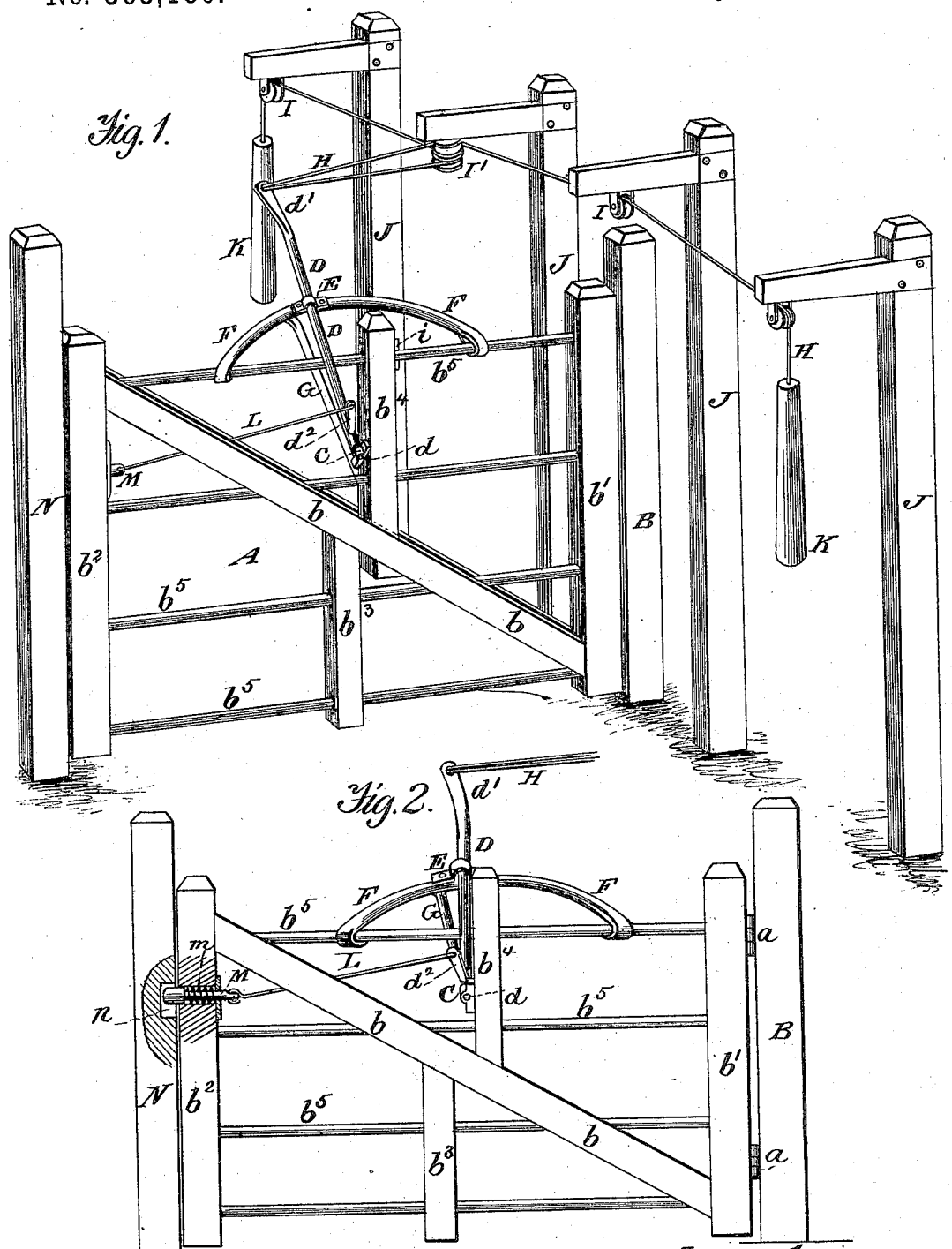

WILLIAM A. SMITH, OF JACKSONVILLE, ILLINOIS.

SWINGING GATE.

SPECIFICATION forming part of Letters Patent No. 363,180, dated May 17, 1887.

Application filed June 22, 1886. Renewed April 18, 1887. Serial No. 235,273. (No model.)

*To all whom it may concern:*

Be it known that I, WILLIAM A. SMITH, a citizen of the United States, residing at Jacksonville, in the county of Morgan and State of Illinois, have invented certain new and useful Improvements in Swinging Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to provide a swinging gate with means whereby the driver of a vehicle may swing it open and close it without getting down from his seat.

Figure 1 of the drawings is a view in perspective, and Fig. 2 a vertical longitudinal elevation, of the closed gate and its posts.

In the drawings, A represents a swinging gate hinged at $a\,a$ to the post B, and consisting of diagonal bars $b$, made fast to the lower end of one upright, $b'$, and to the upper part of the upright $b^2$. On the upper and lower side of the diagonal bars $b$, I use the auxiliary uprights $b^3\,b^4$, which serve to hold the rails $b^5$ at the desired distance apart.

On the front of auxiliary upright $b^4$ is bolted or otherwise secured a socket, C, in which fits the round end pivot, $d$, of a rod, D. This rod has a bent upper end or arm, $d'$, which is used, like an ordinary crank-arm, to turn the rod and also the pivot $d$ in the socket. This rod D passes through a keeper, E, on a curved bar, F, secured at each end to the top rail and braced from the upright $b'$ by the inclined bar G. The upper end or arm, $d'$, is connected to a rope, H, passing round pulleys I I' on the projecting arms of the posts J J, which are arranged at a proper distance on each side of the gate and at right angles thereto, being preferably twelve and twenty-four feet from the hinge-post B. To the end of each rope is attached a handle, K, by the pulling of which the rod D may be turned in its socket.

$d^2$ is an arm near the lower end or pivot of the rod. This is connected by a wire, L, or any suitable fastening, with a plunger, M, which is held in the cavity $n$ of the latch-post N by a surrounding spiral spring, $m$. By turning the rod and pulling the wire the spring-power is overcome and the gate unlatched.

Both the ropes H are carried from pulleys I to pulleys I' on a post, toward which the gate opens, before they are taken to the rod D. A pull from either handle K will therefore be in the same line. A quick jerk will unlatch the gate and give it a sufficient impulse to swing open, or, when latched at $i$ on the outer post upon the opening side, to close.

In practice my gate opening and closing mechanism operates very easily, with great certainty, and with little liability to get out of order.

Having thus described all that is necessary to a full understanding of my invention, what I claim as new, and desire to protect by Letters Patent, is—

The combination of the swinging gate having an upright, $b^4$, curved bar F, and inclined bar G, with the rod D, the ropes H H, pulleys I I', and posts J J, the said rod D being journaled in keepers E $d$ on said curved bar and upright, and means for connecting the rod D with the gate-latch, as shown and described.

In testimony whereof I affix my signature in presence of two witnesses.

WILLIAM A. SMITH.

Witnesses:
 THOMAS G. TAYLOR,
 ABNER M. UPHAM.